(12) United States Patent
Houck

(10) Patent No.: US 12,474,524 B2
(45) Date of Patent: Nov. 18, 2025

(54) PHOTONIC TRANSMISSION STRUCTURE

(71) Applicant: VIAVI Solutions Inc., Chandler, AZ (US)

(72) Inventor: William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 163 days.

(21) Appl. No.: 18/179,436

(22) Filed: Mar. 7, 2023

(65) Prior Publication Data

US 2023/0204857 A1 Jun. 29, 2023

Related U.S. Application Data

(63) Continuation of application No. 17/444,129, filed on Jul. 30, 2021, now Pat. No. 11,609,372.

(60) Provisional application No. 62/706,185, filed on Aug. 4, 2020.

(51) Int. Cl.
*G02B 6/12* (2006.01)
*G02B 6/122* (2006.01)

(52) U.S. Cl.
CPC ....... *G02B 6/1223* (2013.01); *G02B 6/12004* (2013.01); *G02B 6/122* (2013.01); *G02B 2006/12057* (2013.01); *G02B 2006/12107* (2013.01); *G02B 2006/12166* (2013.01)

(58) Field of Classification Search
CPC ........ G02B 6/12; G02B 6/122; G02B 6/1223; G02B 2006/12057
See application file for complete search history.

(56) References Cited

U.S. PATENT DOCUMENTS

| | | | |
|---|---|---|---|
| 11,609,372 B2 | 3/2023 | Houck | |
| 2003/0170504 A1* | 9/2003 | Taninaka | C23C 14/352 428/689 |
| 2005/0030999 A1 | 2/2005 | Yoneda | |
| 2005/0082557 A1 | 4/2005 | Seong et al. | |
| 2007/0087155 A1* | 4/2007 | Kariyada | G11B 7/24038 428/64.4 |
| 2008/0308833 A1* | 12/2008 | Moriyama | H01L 33/42 257/E33.064 |
| 2010/0102698 A1* | 4/2010 | Zhao | H01K 1/325 428/220 |
| 2010/0308445 A1 | 12/2010 | Michiue et al. | |
| 2012/0032081 A1* | 2/2012 | Itsuji | G02F 1/35 250/340 |

(Continued)

OTHER PUBLICATIONS

N. MacFarlane et al. Niobium-tantalum oxide as a material platform for linear and nonlinear integrated photonics. Optics Express, 30:23, 42155-42167. (https://doi.org/10.1364/OE.473756) (Year: 2022).*

(Continued)

*Primary Examiner* — Michael Stahl
(74) *Attorney, Agent, or Firm* — FOLEY & LARNDER LLP

(57) ABSTRACT

In some implementations, a photonic transmission structure includes a first cladding structure; a first active structure disposed over the first cladding structure; and a second cladding structure disposed over the first active structure. The first active structure includes a non-alkali, oxide solution that includes a cation that is niobium.

20 Claims, 7 Drawing Sheets

150 →

(56) References Cited

U.S. PATENT DOCUMENTS

| | | | |
|---|---|---|---|
| 2020/0158970 A1 | 5/2020 | Carothers et al. | |
| 2021/0249844 A1 | 8/2021 | Nakajima et al. | |
| 2022/0043204 A1 | 2/2022 | Houck | |
| 2022/0043208 A1 | 2/2022 | Hsia et al. | |
| 2023/0146862 A1* | 5/2023 | Houck | G02B 6/12004 385/122 |
| 2023/0393325 A1* | 12/2023 | Sadeghi | G02B 6/0038 |

OTHER PUBLICATIONS

K. Lodewijks et al. Low loss high refractive index niobium oxide waveguide platform for visible light applications. Advanced Photonics Congress 2018, paper ITh2B.3. (https://doi.org/10.1364/IPRSN.2018.ITh2B.3) (Year: 2018).*

S. Narita et al. Evaluation of niobium titanium oxide optical thin films. Optical Interference Coatings 2016, paper TB.11. (https://doi.org/10.1364/OIC.2016.TB.11) (Year: 2016).*

Belt M., et al., "Ultra-Low-Loss $Ta_2O_5$-Core/$SiO_2$-Clad Planar Waveguides on Si Substrates," Optica, May 2017, vol. 4(5), 5 pages.

Black J. A., et al., "Group-Velocity Dispersion Engineering of Tantala Integrated Photonics," 5 pages.

Cheng L., et al., "Grating Couplers on Silicon Photonics: Design Principles, Emerging Trends and Practical ssues," Micromachines, 2020, 25 pages.

Carlson, David R. et al., "Tantala Nonlinear Photonics: Design fabrication, and Packaging," IEEE, 2019, 2 pages.

Guan X., et al., "Compact Titanium Dioxide Waveguides with High Nonlinearity at Telecommunication Wavelengths," Optics Express, 2018, vol. 26(2), 9 pages.

Itoh M., et al., "Low-Loss Silica-Based $SiO_2$-$Ta_2O_5$ Waveguides With Extremely High Delta Fabricated Using Sputtered Thin Films," IEEE; Journal of Lightwave Technology, Jan. 15, 2015, vol. 33(2), pp. 318-323.

Macfarlane N., et al., "A Multi-Layer Platform for Low-Loss Nonlinear Silicon Photonics," APL Photonics, 2019, 9 pages.

Wang C., et al., "Monolithic Lithium Niobate Photonic Circuits for Kerr Frequency Comb Generation and Modulation," Nature Communications, 2019, 6 pages.

Alexa R. Carollo, et al., "Integrated Nonlinear Photonics with $TiO_2$-$Ta_2O_5$ Mixtures", Optica Nonlinear Optics Topical Meeting 2023; 2023; 2 pages; Optica Publishing Group.

Beatrice R. Bricchi, et al., "Optical and electronic properties of transparent conducting Ta: $TiO_2$ thin and ultra-thin films: the effect of doping and thickness", Materials Advances; Sep. 7, 2021; pp. 7064-7076; vol. 2; Royal Society of Chemistry.

Extended European Search Report on Appl. Ser. No. EP24176613.8 dated Oct. 15, 2024 (10 Pages).

J.L. Waring, et al., "Effect of Oxide Additions on the Polymorphism of Tantalum Pentoxide (System $Ta_2O_5$-$TiO_2$)", Journal of Research of the National Bureau of Standards—A Physics and Chemistry; Dec. 8, 1967; pp. 175-186; vol. 72A, No. 2.

J.Y. Gan, et al., "Dielectric property of $(TiO_2)_x$-$(Ta_2O_5)_{1-x}$ thin films", Applied Physics Letters; Jan. 19, 1998; 4 pages; vol. 72, No. 3; http://dx.doi.org/10.1063/1.1207 46; AIP Publishing.

Prashant Thapliyal, et al., "Influence of post-deposition annealing on electrical and optical properties of $(Ta_2O_5)_{1-x}$—$(TiO_2)_x$ thin films, x<0.08", Ceramics International; Feb. 27, 2021; p. 16746-16751; vol. 47; Elsevier Ltd and Techna Group S.r.l.

Prashant Thapliyal, et al., "Post deposition annealing dependent structural and C-V characteristics of $(Ta_2O_5)_{0.965}$-$(TiO_2)_{0.035}$ thin films", Materials Today: Proceedings; Sep. 2020; pp. 1-5; Elsevier; https://doi.org/10.1016/j.matpr.2020.09.297.

\* cited by examiner

US 12,474,524 B2

PHOTONIC TRANSMISSION STRUCTURE

RELATED APPLICATIONS

This application is a continuation of U.S. patent application Ser. No. 17/444,129, filed Jul. 30, 2021 (now U.S. Pat. No. 11,609,372), which claims priority to U.S. Provisional Patent Application No. 62/706,185, filed on Aug. 4, 2020, the contents of which are incorporated by reference herein in their entireties.

BACKGROUND

Integrated photonics is a branch of photonics in which waveguides and other photonic devices are fabricated as an integrated structure on a substrate surface. For example, a photonic integrated circuit (PIC) may use semiconductor-grade materials (e.g., silicon, indium phosphide, dielectrics such as silicon dioxide or silicon nitride, and/or the like) as a platform to integrate active and passive photonic circuits with electronic components on a single chip. As a result of integration, complex photonic circuits can process and transmit light (e.g., photons) in similar ways to how electronic integrated circuits process and transmit electrons.

SUMMARY

In some implementations, a photonic transmission structure includes a first cladding structure; a first active structure disposed over the first cladding structure; and a second cladding structure disposed over the first active structure, wherein: the first active structure includes a non-alkali, oxide solution that includes a cation that is niobium.

In some implementations, an optical device includes a plurality of photonic transmission structures, wherein: a first photonic transmission structure, of the plurality of photonic transmission structures, is disposed on a second photonic transmission structure of the plurality of photonic transmission structures; and each photonic transmission structure, of the plurality of photonic transmission structures, comprises: a first cladding structure, a first active structure disposed over the first cladding structure, a second cladding structure disposed over the first active structure, a second active structure disposed over the second cladding structure, and a third cladding structure disposed over the second active structure, wherein: the first active structure includes a non-alkali, oxide solution that includes a cation that is niobium.

In some implementations, a method of forming an optical device includes forming a first cladding structure; forming a first active structure over the first cladding structure; forming a second cladding structure over the first active structure; forming a second active structure over the second cladding structure; and forming a third cladding structure over the second active structure, wherein: the first active structure is formed using a first sputtering process, the second active structure is formed using a second sputtering process, the first cladding structure, the second cladding structure, and the third cladding structure are each formed using a third sputtering process, and at least one of the first active structure and the second active structure includes a non-alkali, oxide solution that includes a cation that is niobium.

DETAILED DESCRIPTION

Figure 1A:
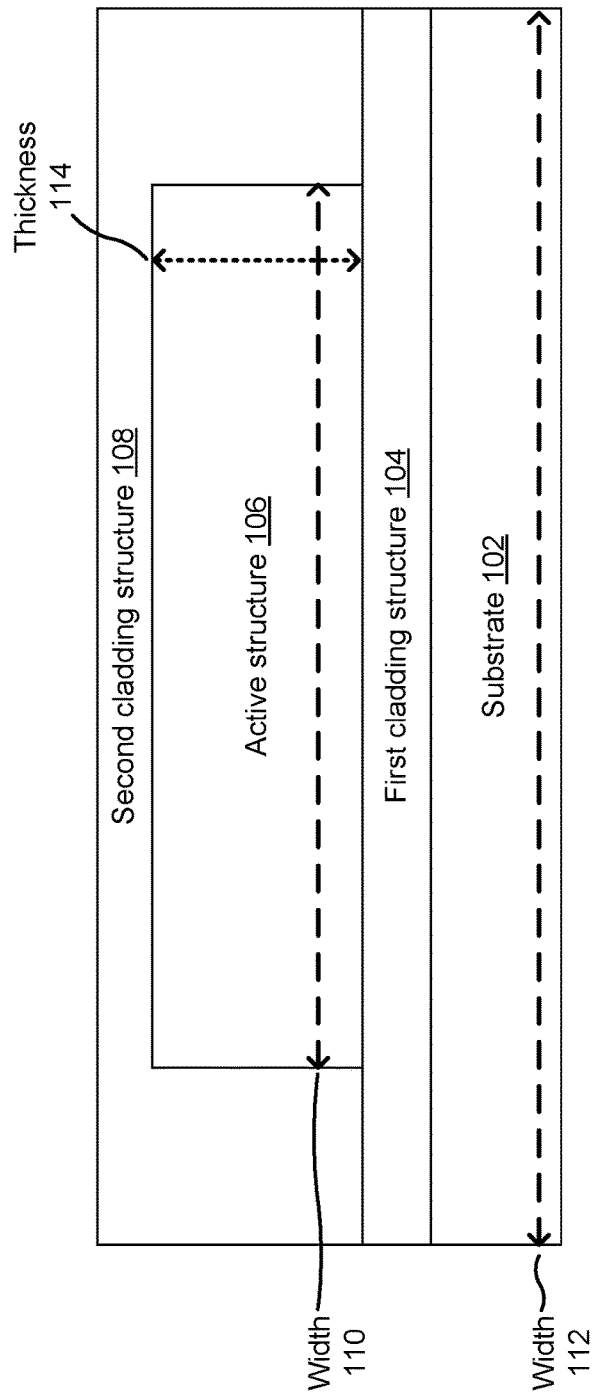
FIGS. 1A-1C are diagrams of example photonic transmission structures described herein.

The following detailed description of example implementations refers to the accompanying drawings. The same reference numbers in different drawings may identify the same or similar elements.

In many cases, optical structures for a conventional PIC include a silicon nitride layer (e.g., that has a refractive index between 2 and 2.5), a silicon layer (e.g., that has a refractive index greater than 3.9), and/or one or more silicon dioxide layers (e.g., that has a refractive index less than 1.5). Typically, the silicon nitride layer, the silicon layer, and/or the one or more silicon dioxide layers are formed using a conventional deposition process, such as plasma-enhanced chemical vapor deposition (PECVD), which has a high processing temperature (e.g., a processing temperature that is greater than 300 degrees Celsius (C)). Consequently, because of the high processing temperature, using the conventional deposition process to form an additional optical structure on top of an already formed optical structure can affect an optical behavior of the silicon nitride layer and/or the silicon layer of the already formed optical structure (e.g., the high processing temperature may damage the silicon nitride layer and/or the silicon layer). Thus, a robust, three-dimensional PIC (e.g., that comprises vertically stacked optical structures) cannot be formed using a conventional deposition process.

Some implementations described herein provide a photonic transmission structure that includes an active structure that comprises a non-alkali, oxide solution that includes a cation that is niobium. The non-alkali, oxide solution that includes a cation that is niobium may include at least one of a non-alkali, binary oxide solution that includes a cation that is niobium; a non-alkali, ternary oxide solution that includes a cation that is niobium; a non-alkali, quaternary oxide solution that includes a cation that is niobium; or a non-alkali, quinary oxide solution that includes a cation that is niobium (and so on). For example, the active structure may include at least one of a niobium tantalum oxide solution or a niobium titanium oxide solution that may have refractive indices of 2.172 and 2.312, respectively, and extinction coefficients of approximately 0. Accordingly, the non-alkali, oxide solution that includes a cation that is niobium may be used instead of a silicon nitride layer while providing a similar refractive index of that of silicon nitride and providing low optical loss.

In some implementations, the active structure may be formed using a sputtering process with a low operating temperature (e.g., an operating temperature that is less than or equal to 200 degrees C. and/or an operating temperature associated with a conventional deposition process). Moreover, in some implementations, the photonic transmission structure may include one or more cladding structures and/or an additional active structure that may be formed using the sputtering process and/or one or more additional sputtering processes with respective low operating temperatures. Accordingly, using the sputtering process and/or the one or more additional sputtering processes to form an additional photonic transmission structure on top of an already formed photonic transmission structure (e.g., to form an optical device, such as a PIC) reduces a likelihood of affecting an optical behavior of an active structure of the already formed optical structure (e.g., the low processing temperatures are less likely to damage the active structure) than would otherwise be possible using a conventional deposition process with a high operating temperature.

Thus, a robust, three-dimensional optical device (e.g., that comprises vertically stacked photonic transmission structures) can be formed using the sputtering process and/or the one or more additional sputtering processes. Further, using the sputtering process and/or the one or more additional sputtering processes causes the active structure, the one or more cladding structures, and/or the additional active structure of a photonic transmission structure to have a substantially uniform thicknesses, which improves a performance and/or reliability of the photonic transmission structure.

Figure 1B:
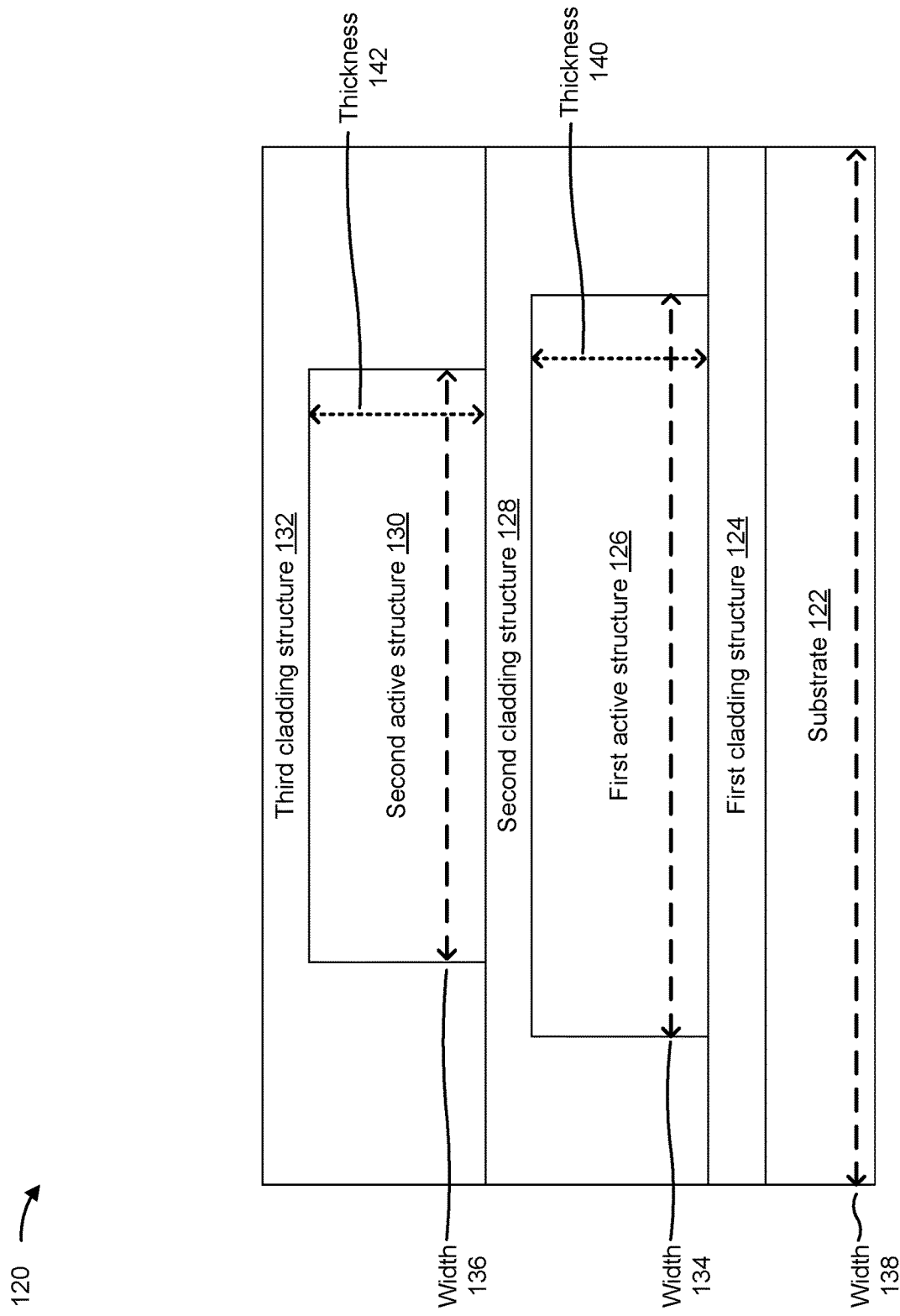
Figure 1C:
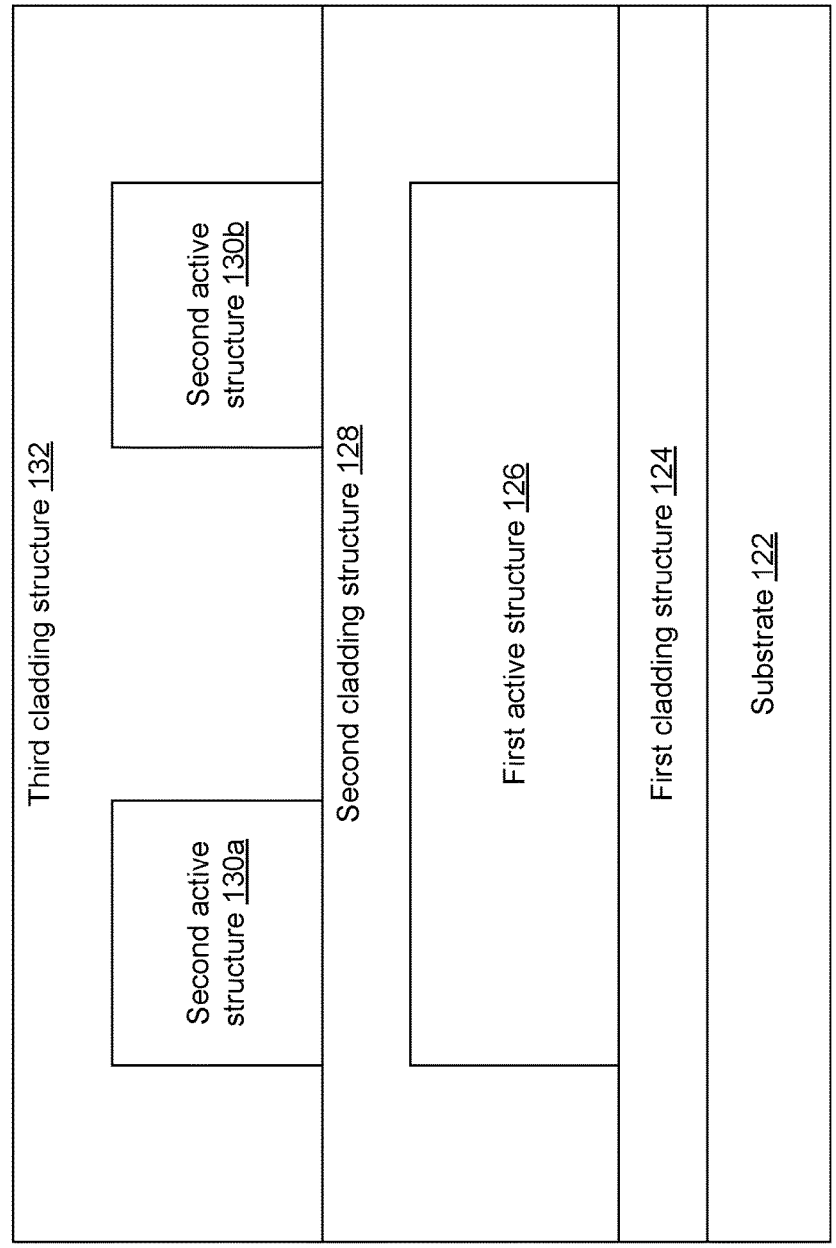

FIGS. 1A-1C are diagrams of example photonic transmission structures 100, 120, and 150 described herein. A photonic transmission structure may be, for example, an optical logic gate, a frequency comb, an optical amplifier, and/or an optical modulator. As shown in FIGS. 1A-1C, each photonic transmission structure may include a substrate and a particular configuration of active structures and/or cladding structures formed over the substrate. While implementations described herein are directed to photonic transmission structures, contemplated implementations also include any optical structure that can be used in association with non-linear optics.

As shown in FIG. 1A, the photonic transmission structure 100 may include a substrate 102, a first cladding structure 104, an active structure 106, and/or a second cladding structure 108. The substrate 102 may include a substrate upon which other layers and/or structures shown in FIG. 1A are formed. The substrate 102 may be a transmissive substrate, such as a glass substrate, a silicon (Si) substrate, or a germanium (Ge) substrate. In some implementations, the substrate 102 may have a refraction index that satisfies (e.g., is less than or equal to) a refraction index threshold. For example, the refraction threshold may be less than or equal to 1.6.

The first cladding structure 104 may be disposed over the substrate 102. For example, the first cladding structure 104 may be disposed on (e.g., directly on) a surface of the substrate 102 (e.g., a top surface of the substrate 102) or on one or more intervening layers or structures between the substrate 102 and the first cladding structure 104. The first cladding structure 104 may be configured to confine light (e.g., within the active structure 106). In some implementations, the first cladding structure may comprise an oxide material (e.g., a silicon dioxide ($SiO_2$) material), a polymer material (e.g., a siloxane polymer material), or an air cladding, among other examples.

The active structure 106 may be disposed over the first cladding structure 104 and/or the substrate 102. For example, the active structure 106 may be disposed on (e.g., directly on) a surface of the first cladding structure 104 (e.g., a top surface of the first cladding structure 104) or on one or more intervening layers or structures between the first cladding structure 104 and the active structure 106. When the photonic transmission structure 100 does not include the first cladding structure 104, the active structure may 106 be disposed on (e.g., directly on) a surface of the substrate 102 (e.g., a top surface of the substrate 102) or on one or more intervening layers or structures between the substrate 102 and the active structure 106. The active structure 106 may be configured to transmit and/or generate light. In some implementations, the active structure 106 may comprise a non-alkali, oxide solution that includes a cation that is niobium. The non-alkali, oxide solution that includes a cation that is niobium may include at least one of a non-alkali, binary oxide solution that includes a cation that is niobium; a non-alkali, ternary oxide solution that includes a cation that is niobium; a non-alkali, quaternary oxide solution that includes a cation that is niobium; or a non-alkali, quinary oxide solution that includes a cation that is niobium (and so on). For example, the active structure 106 may include at least one of a niobium tantalum oxide solution, a niobium titanium oxide solution, or a niobium tantalum titanium oxide solution. As another example, the active structure 106 may include at least one of a niobium aluminum oxide solution, a niobium strontium oxide solution, a niobium aluminum strontium oxide solution, a niobium tantalum aluminum oxide solution, a niobium titanium aluminum oxide solution, a niobium tantalum strontium solution, a niobium titanium strontium oxide solution, a niobium titanium tantalum aluminum oxide solution, a niobium titanium tantalum strontium oxide solution, a niobium titanium aluminum strontium oxide solution, a niobium tantalum aluminum strontium oxide solution, or a niobium titanium tantalum aluminum strontium oxide solution. In some implementations, the active structure 106 may comprise at least one of a non-alkali, oxide solution that includes a cation that is niobium, an amorphous silicon (a-Si) material, a hydrogenated amorphous silicon (a-Si:H) material, a nitride-based material, an oxide-based material, a metal material, or a semiconductor material, among other examples.

As shown in FIG. 1A, the active structure 106 may comprise a planar structure that has a width 110, which may be less than or equal to a width 112 of the substrate 102. As further shown in FIG. 1A, the active structure 106 may have a thickness 114 (e.g., in a range of 100 nanometers (nm) to 2000 nm). In some implementations, the thickness 114 may be substantially uniform. For example, the thickness 114 may vary less than a threshold percentage across a surface of the active structure 106 (e.g., a top surface of the active structure 106). The threshold percentage may be less than or equal to 1%.

The second cladding structure 108 may be disposed over the active structure 106. For example, the second cladding structure 108 may be disposed on (e.g., directly on) a surface of the active structure 106 (e.g., a top surface of the active structure 106) or on one or more intervening layers or structures between the active structure 106 and the second cladding structure 108. In some implementations, when the width 110 of the active structure 106 is less than the width 112 of the substrate 102, the first cladding structure 104 also may be disposed on one or more portions of a surface of the first cladding structure 104 (e.g., one or more portions of a top surface of the first cladding structure 104). Alternatively, when the photonic transmission structure 100 does not include the first cladding structure 104, the second cladding structure 108 be disposed on one or more portions of a surface of the substrate 102 (e.g., a top surface of the substrate 102). The second cladding structure 108 may be configured to confine light (e.g., within the active structure 106). In some implementations, the second cladding structure 108 may comprise an oxide material (e.g., an $SiO_2$ material), a polymer material (e.g., a siloxane polymer material), or an air cladding, among other examples.

In some implementations, the photonic transmission structure 100 may be formed using one or more sputtering processes, such as one or more magnetron sputtering processes, one or more ion-beam sputtering processes, one or more reactive sputtering processes, one or more alternating-current (AC) sputtering processes, or one or more directcurrent (DC) sputtering processes. For example, the first cladding structure 104 may be formed over the substrate 102 using a first sputtering process, the active structure 106 may be formed over the first cladding structure 104 using a second sputtering process, and the second cladding structure 108 may be formed over the active structure 106 using the first sputtering process. A processing temperature associated with the first sputtering process and/or the second sputtering process may satisfy (e.g., may be less than or equal to) a processing temperature threshold. For example, the processing temperature threshold may be less than or equal to 200 degrees Celsius (C). In some implementations, the processing temperature threshold may be less than a temperature associated with affecting an optical behavior of the active structure 106 (e.g., a temperature that may damage the active structure 106). Further details relating to forming photonic transmission structures are described herein in relation to FIG. 3.

As shown in FIG. 1B, the photonic transmission structure 120 may include a substrate 122, a first cladding structure 124, a first active structure 126, a second cladding structure 128, a second active structure 130, and/or a third cladding structure 132. The substrate 122, the first cladding structure 124, the first active structure 126, and/or the second cladding structure 128 may be the same as, or similar to, corresponding structures described herein in relation to FIG. 1A. For example, the first cladding structure 124, the first active structure 126, and/or the second cladding structure 128 respectively may be the same as, or similar to, the substrate 102, the first cladding structure 104, the active structure 106, and/or the second cladding structure 108. Additionally, or alternatively, the substrate 122, the first cladding structure 124, the first active structure 126, and/or the second cladding structure 128 may be formed in a same, or similar, configuration as that of the corresponding structures described herein in relation to FIG. 1A. For example, the first cladding structure 124 may be disposed over the substrate 122, the first active structure 126 may be disposed over the first cladding structure 124 and/or the substrate 122, and/or the second cladding structure 128 may be formed over the first active structure 126.

The second active structure 130 may be disposed over the second cladding structure 128. For example, the second active structure 130 may be disposed on (e.g., directly on) a surface of the second cladding structure 128 (e.g., a top surface of the second cladding structure 128) or on one or more intervening layers or structures between the second cladding structure 128 and the second active structure 130. The second active structure 130 may be configured to transmit and/or generate light. In some implementations, the second active structure 130 may comprise a non-alkali, oxide solution that includes a cation that is niobium. The non-alkali, oxide solution that includes a cation that is niobium may include at least one of a non-alkali, binary oxide solution that includes a cation that is niobium; a non-alkali, ternary oxide solution that includes a cation that is niobium; a non-alkali, quaternary oxide solution that includes a cation that is niobium; or a non-alkali, quinary oxide solution that includes a cation that is niobium (and so on). For example, the second active structure 130 may include at least one of a niobium tantalum oxide solution, a niobium titanium oxide solution, or a niobium tantalum titanium oxide solution. As another example, the second active structure 130 may include at least one of a niobium aluminum oxide solution, a niobium strontium oxide solution, a niobium aluminum strontium oxide solution, a niobium tantalum aluminum oxide solution, a niobium titanium aluminum oxide solution, a niobium tantalum strontium oxide solution, a niobium titanium strontium oxide solution, a niobium titanium tantalum aluminum oxide solution, a niobium titanium tantalum strontium oxide solution, a niobium titanium aluminum strontium oxide solution, a niobium tantalum aluminum strontium oxide solution, or a niobium titanium tantalum aluminum strontium oxide solution. In some implementations, the second active structure 130 may comprise at least one of a non-alkali, oxide solution that includes a cation that is niobium, an amorphous silicon (a-Si) material, a hydrogenated amorphous silicon (a-Si:H) material, a nitride-based material, an oxide-based material, a metal material, or a semiconductor material, among other examples.

As shown in FIG. 1B, the first active structure 126 may comprise a planar structure that has a width 134 and the second active structure 130 may comprise a planar structure that has a width 136, each of which may be less than or equal to a width 138 of the substrate 122. In some implementations, the width 134 of the first active structure 126 may be the same as or different than the width 136 of the second active structure 130. For example, in some implementations, the width 134 may be greater than or equal to the width 136 or, in some other implementations, the width 134 may be less than the width 136.

As further shown in FIG. 1B, the first active structure 126 may have a thickness 140 (e.g., in a range of 100 nm to 2000 nm) and the second active structure 130 may have a thickness 142 (e.g., in a range of 100 nm to 2000 nm). In some implementations, at least one of the thickness 140 or the thickness 142 may be substantially uniform. For example, the thickness 140 may vary less than a threshold percentage across a surface of the first active structure 126 (e.g., a top surface of the first active structure 126) and/or the thickness 142 may vary less than the threshold percentage across a surface of the second active structure 130 (e.g., a top surface of the second active structure 130). The threshold percentage may be less than or equal to 1%.

In some implementations, at least a portion of the first active structure 126 may be positioned within an evanescent field of the second active structure 130. For example, the first active structure 126 may be a particular distance from the second active structure 130 to cause one or more portions of the first active structure 126 to be within an evanescent field of the second active structure 130 (e.g., to allow light to couple from the second active structure 130 to the first active structure 126). Additionally, or alternatively, at least a portion of the second active structure 130 may be positioned within an evanescent field of the first active structure 126. For example, the second active structure 130 may be a particular distance from the first active structure 126 to cause one or more portions of the second active structure 130 to be within an evanescent field of the first active structure 126 (e.g., to allow light to couple from the first active structure 126 to the second active structure 130).

The third cladding structure 132 may be disposed over the second active structure 130. For example, the third cladding structure 132 may be disposed on (e.g., directly on) a surface of the second active structure 130 (e.g., a top surface of the second active structure 130) or on one or more intervening layers or structures between the second active structure 130 and the third cladding structure 132. In some implementations, when the width 136 of the second active structure 130 is less than the width 138 of the substrate 122, the third cladding structure 132 also may be disposed on one or more portions of a surface of the second cladding structure 128 (e.g., one or more portions of a top surface of the second cladding structure 128). The third cladding structure 132 may be configured to confine light (e.g., within the first active structure 126 and/or the second active structure 130). In some implementations, the third cladding structure 132 may comprise an oxide material (e.g., an $SiO_2$ material), a polymer material (e.g., a siloxane polymer material), or an air cladding, among other examples.

In some implementations, the photonic transmission structure 120 may be formed using one or more sputtering processes, such as one or more magnetron sputtering processes, one or more ion-beam sputtering processes, one or more reactive sputtering processes, one or more AC sputtering processes, or one or more DC sputtering processes. For example, the first cladding structure 124 may be formed over the substrate 122 using a first sputtering process, the first active structure 126 may be formed over the first cladding structure 124 using a second sputtering process, the second cladding structure 128 may be formed over the first active structure 126 using the first sputtering process, the second active structure 130 may be formed over the second cladding structure 128 using a third sputtering process, and/or the third cladding structure 132 may be formed over the second active structure 130 using the first sputtering process. A processing temperature associated with the first sputtering process, the second sputtering process, and/or the third sputtering process may satisfy (e.g., may be less than or equal to) a processing temperature threshold. For example, the processing temperature threshold may be less than or equal to 200 degrees C. In some implementations, the processing temperature threshold is less than a temperature associated with affecting a respective optical behavior of an active structure, such as the first active structure 126 or the second active structure 130. Further details relating to forming photonic transmission structures are described herein in relation to FIG. 3.

As shown in FIG. 1C, the photonic transmission structure 150 may include the substrate 122, the first cladding structure 124, the first active structure 126, the second cladding structure 128, the second active structure 130, and/or the third cladding structure 132 of the photonic transmission structure 120 shown in FIG. 1B, but in a configuration that is different than the configuration of the photonic transmission structure 120. For example, as shown in FIG. 1C, the second active structure 130 may be divided into separate substructures (shown as second active structure 130a and second active structure 130b).

Accordingly, each of the separate substructures of the second active structure 130 may be disposed over the second cladding structure 128. For example, each of the second active structure 130a and the second active structure 130b may be disposed on (e.g., directly on) a surface of the second cladding structure 128 (e.g., a top surface of the second cladding structure 128) or on one or more intervening layers or structures between the second cladding structure 128 and the second active structure 130a and the second active structure 130b.

While FIG. 1C shows the second active structure 130 divided into two separate substructures, other configurations are also contemplated. For example, the second active structure 130 may be divided into three or more separate substructures. As another example, the first active structure 126 may be divided into two or more separate substructures (e.g., a first active structure 126a, a first active structure 126b, and so on).

In some implementations, the photonic transmission structure 150 may be formed using one or more sputtering processes, such as one or more magnetron sputtering processes, one or more ion-beam sputtering processes, one or more reactive sputtering processes, one or more AC sputtering processes, or one or more DC sputtering processes. For example, the first cladding structure 124 may be formed over the substrate 122 using a first sputtering process, the first active structure 126 may be formed over the first cladding structure 124 using a second sputtering process, the second cladding structure 128 may be formed over the first active structure 126 using the first sputtering process, the second active structure 130 may be formed over the second cladding structure 128 using a third sputtering process and one or more etching processes (e.g., to divide the second active structure 130 into two or more separate substructures), and/or the third cladding structure 132 may be formed over the second active structure 130 using the first sputtering process. A processing temperature associated with the first sputtering process, the second sputtering process, and/or the third sputtering process may satisfy (e.g., may be less than or equal to) a processing temperature threshold. For example, the processing temperature threshold may be less than or equal to 200 degrees C. In some implementations, the processing temperature threshold may be less than a temperature associated with affecting a respective optical behavior of an active structure, such as the first active structure 126 or the second active structure 130. Further details relating to forming photonic transmission structures are described herein in relation to FIG. 3.

As indicated above, FIGS. 1A-1C are provided as an example. Other examples may differ from what is described with regard to FIGS. 1A-1C. In practice, the photonic transmission structures 100, 120, and/or 150 may include additional layers and/or structures, fewer layers and/or structures, different layers and/or structures, or differently arranged layers and/or structures than those shown in FIGS. 1A-1C.

Figure 2A:
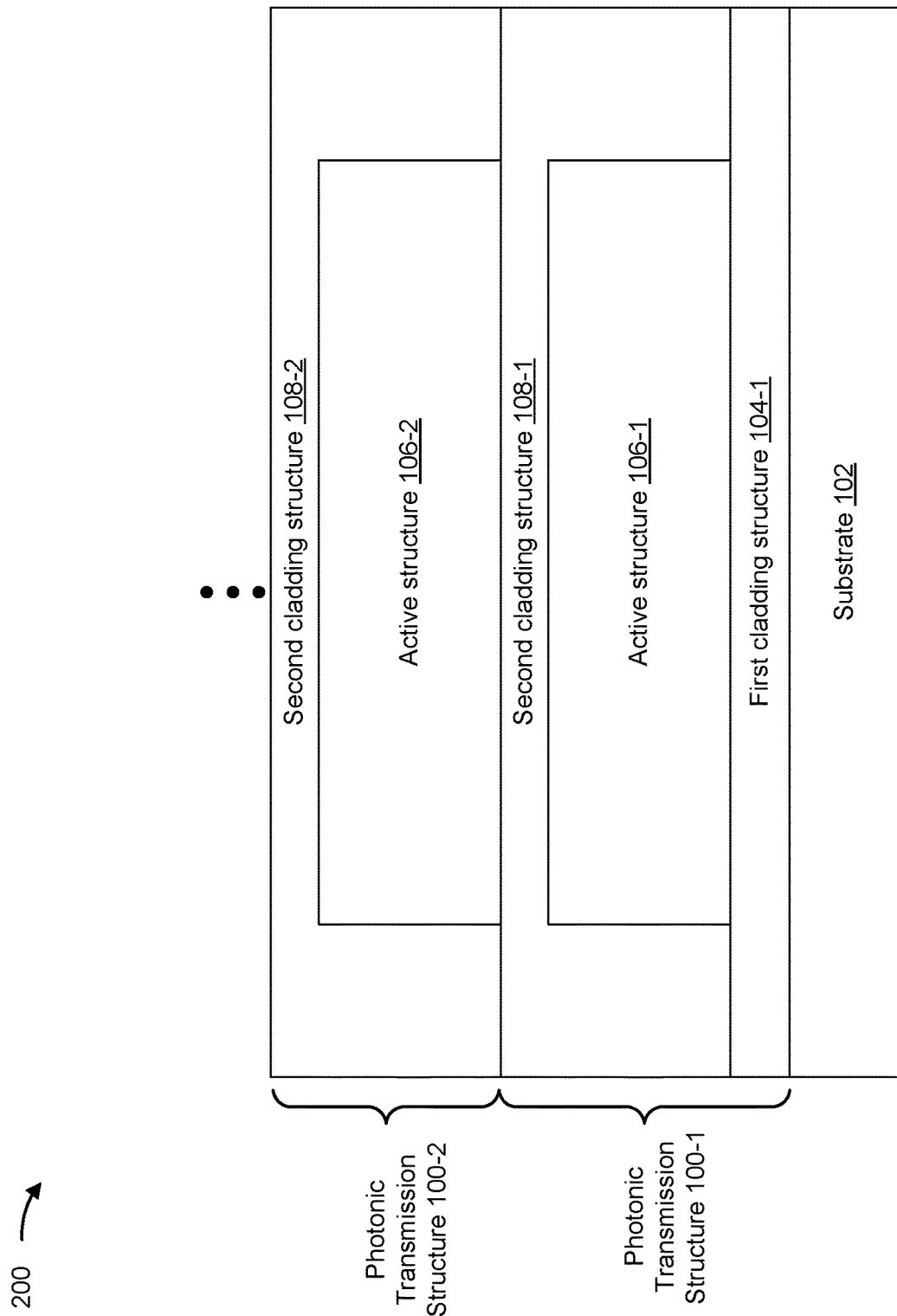
FIGS. 2A-2C are diagrams of example optical devices described herein.
Figure 2B:
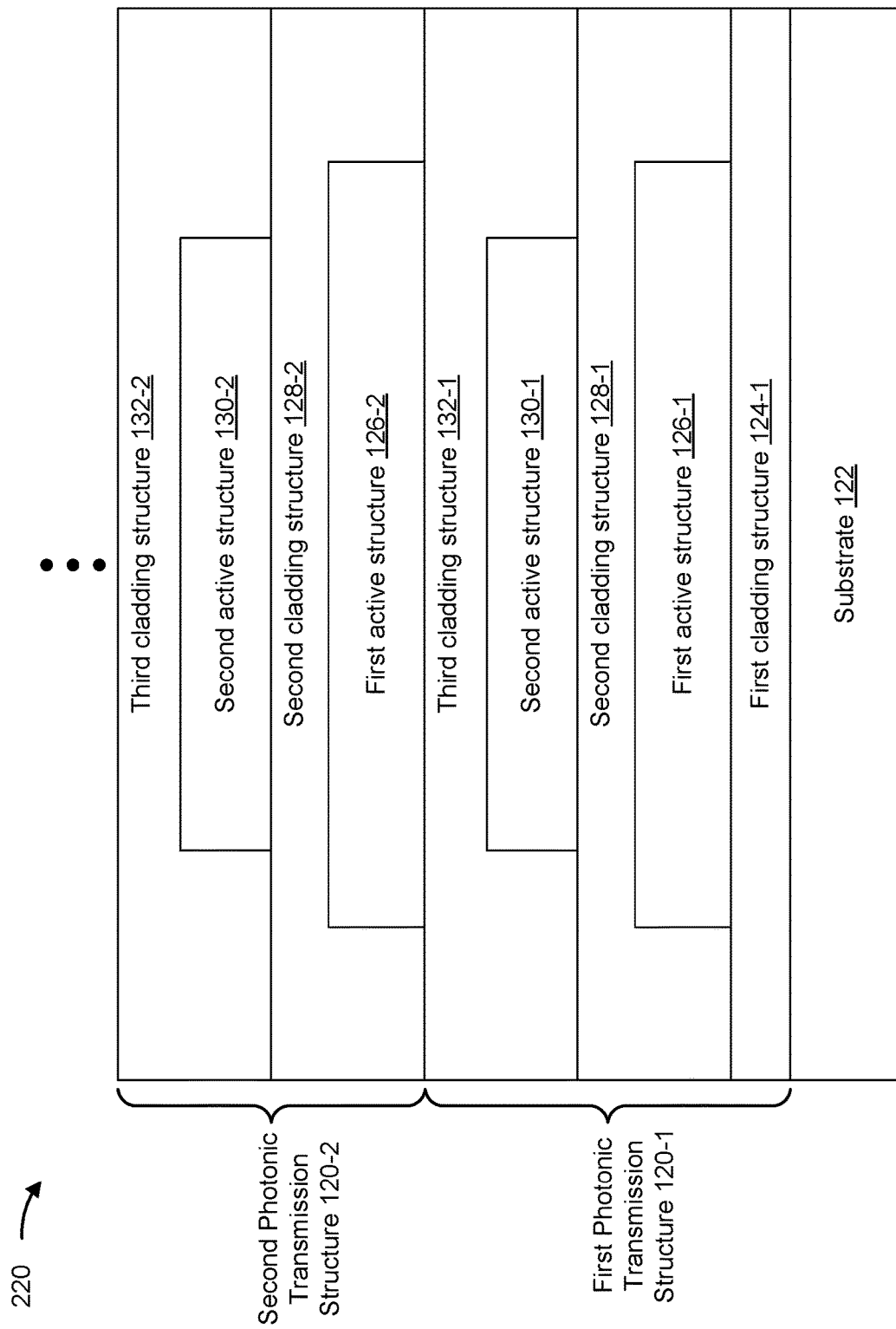
Figure 2C:
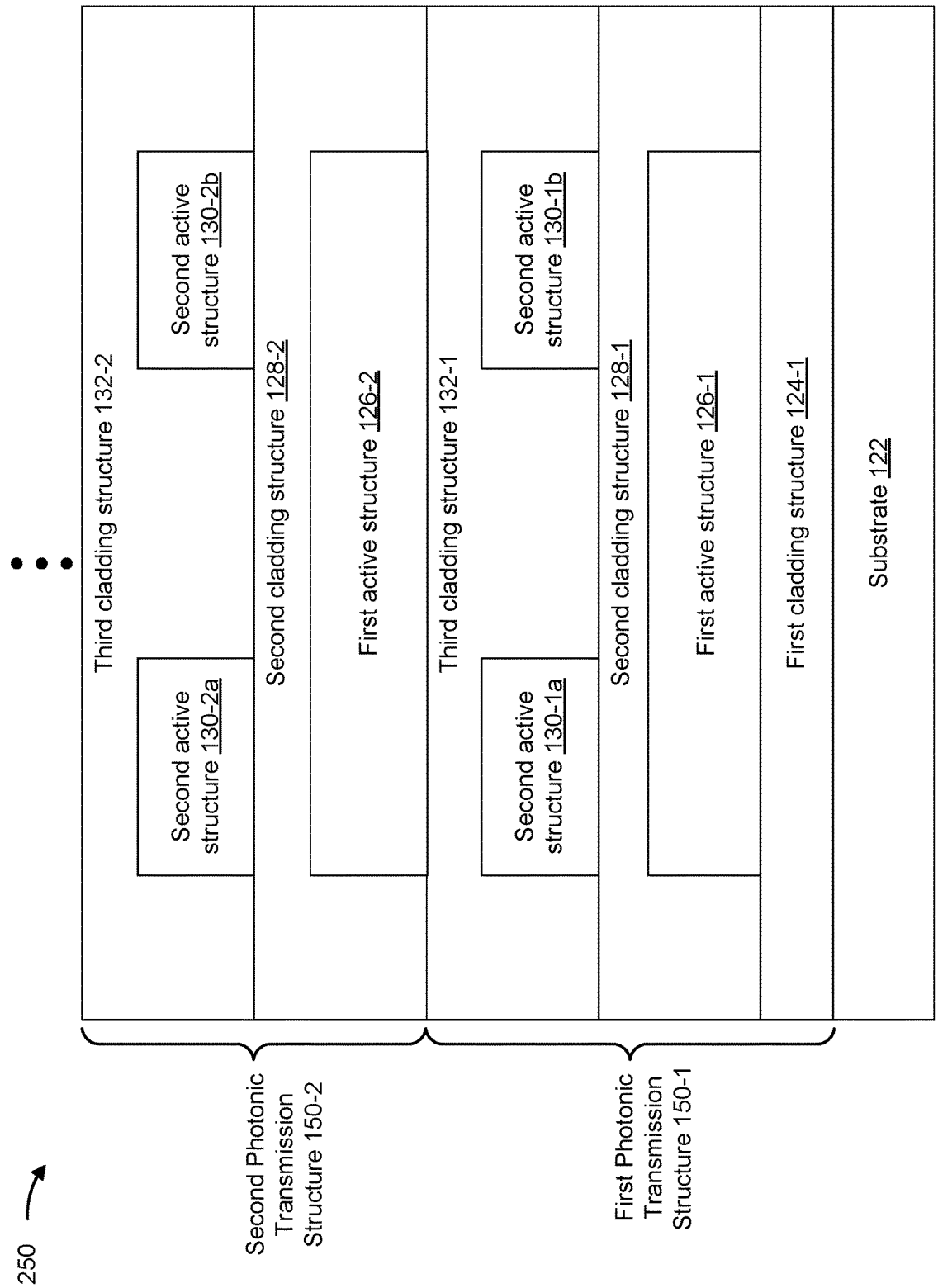

FIGS. 2A-2C are diagrams of example optical devices 200, 220, and 250 described herein. An optical device may include, for example, a photonic integrated circuit (PIC) or a similar optical device. As shown in FIGS. 2A-2C, each optical device may include a plurality of photonic transmission structures (e.g., two or more photonic transmission structures).

As shown in FIG. 2A, the optical device 200 may include a plurality of photonic transmission structures 100 (e.g., two or more of the photonic transmission structures 100 described herein in relation to FIG. 1A). For example, as shown in FIG. 2A, the optical device 200 may include a first photonic transmission structure 100-1 and a second photonic transmission structure 100-2. Each photonic transmission structure 100, of the plurality of photonic transmission structures 100, may include the same, or similar, structures (e.g., that are described herein in relation to FIG. 1A). For example, as shown in FIG. 2A, the first photonic transmission structure 100-1 may include a first cladding structure 104-1, an active structure 106-1, and/or a second cladding structure 108-1 and the second photonic transmission structure 100-2 may include an active structure 106-2 and/or a second cladding structure 108-2.

The plurality of photonic transmission structures 100 may be disposed on one another (e.g., in a stacked and/or vertical configuration). For example, as shown in FIG. 2A, the second photonic transmission structure 100-2 may be disposed on the first photonic transmission structure 100-1. Stated another way, as shown in FIG. 2A, an orientation of the first photonic transmission structure 100-1 may match an orientation of the second photonic transmission structure 100-2 (e.g., the respective structures of the first photonic transmission structure 100-1 and the second photonic transmission structure 100-2 are stacked in a same, bottom-up order) and a bottom surface of the second photonic transmission structure 100-2 may be disposed on a top surface of the first photonic transmission structure 100-1. As further shown in FIG. 2A, the plurality of photonic transmission structures 100 may be disposed over a substrate (e.g., a substrate 102, as described herein in relation to FIG. 1A).

As shown in FIG. 2B, the optical device 220 may include a plurality of photonic transmission structures 120 (e.g., two or more of the photonic transmission structures 120 described herein in relation to FIG. 1B). For example, as shown in FIG. 2B, the optical device 220 may include a first photonic transmission structure 120-1 and a second photonic transmission structure 120-2. Each photonic transmission structure 120, of the plurality of photonic transmission structures 120, may include the same, or similar, structures (e.g., that are described herein in relation to FIGS. 1A-1B). For example, as shown in FIG. 2B, the first photonic transmission structure 120-1 may include a first cladding structure 124-1, a first active structure 126-1, a second cladding structure 128-1, a second active structure 130-1, and/or a third cladding structure 132-1 and the second photonic transmission structure 120-2 may include a first active structure 126-2, a second cladding structure 128-2, a second active structure 130-2, and/or a third cladding structure 132-2.

The plurality of photonic transmission structures 120 may be disposed on one another (e.g., in a stacked and/or vertical configuration). For example, as shown in FIG. 2B, the second photonic transmission structure 120-2 may be disposed on the first photonic transmission structure 120-1. Stated another way, as shown in FIG. 2B, an orientation of the first photonic transmission structure 120-1 may match an orientation of the second photonic transmission structure 120-2 (e.g., the respective structures of the first photonic transmission structure 120-1 and the second photonic transmission structure 120-2 are stacked in a same, bottom-up order) and a bottom surface of the second photonic transmission structure 120-2 may be disposed on a top surface of the first photonic transmission structure 120-1. As further shown in FIG. 2B, the plurality of photonic transmission structures 120 may be disposed over a substrate (e.g., a substrate 122, as described herein in relation to FIG. 1B).

As shown in FIG. 2C, the optical device 250 may include a plurality of photonic transmission structures 150 (e.g., two or more of the photonic transmission structures 150 described herein in relation to FIG. 1C). For example, as shown in FIG. 2C, the optical device 250 may include a first photonic transmission structure 150-1 and a second photonic transmission structure 150-2. Each photonic transmission structure 150, of the plurality of photonic transmission structures 150, may include the same, or similar, structures (e.g., that are described herein in relation to FIGS. 1A-1C). For example, as shown in FIG. 2C, the first photonic transmission structure 150-1 may include a first cladding structure 124-1, a first active structure 126-1, a second cladding structure 128-1, a second active structure 130-1 (e.g., that includes a second active structure 130-1a and a second active structure 130-1b), and/or a third cladding structure 132-1 and the second photonic transmission structure 150-2 may include a first active structure 126-2, a second cladding structure 128-2, a second active structure 130-2 (e.g., that includes a second active structure 130-2a and a second active structure 130-2b), and/or a third cladding structure 132-2.

The plurality of photonic transmission structures 150 may be disposed on one another (e.g., in a stacked and/or vertical configuration). For example, as shown in FIG. 2C, the second photonic transmission structure 150-2 may be disposed on the first photonic transmission structure 150-1. Stated another way, as shown in FIG. 2C, an orientation of the first photonic transmission structure 150-1 may match an orientation of the second photonic transmission structure 150-2 (e.g., the respective structures of the first photonic transmission structure 150-1 and the second photonic transmission structure 150-2 are stacked in a same, bottom-up order) and a bottom surface of the second photonic transmission structure 150-2 may be disposed on a top surface of the first photonic transmission structure 150-1. As further shown in FIG. 2C, the plurality of photonic transmission structures 150 may be disposed over a substrate (e.g., a substrate 122, as described herein in relation to FIGS. 1B-1C).

As indicated above, FIGS. 2A-2C are provided as an example. Other examples may differ from what is described with regard to FIGS. 2A-2C. In practice, the optical devices 200, 220, and/or 250 may include additional layers and/or structures, fewer layers and/or structures, different layers and/or structures, or differently arranged layers and/or structures than those shown in FIGS. 2A-2C.

Figure 3:
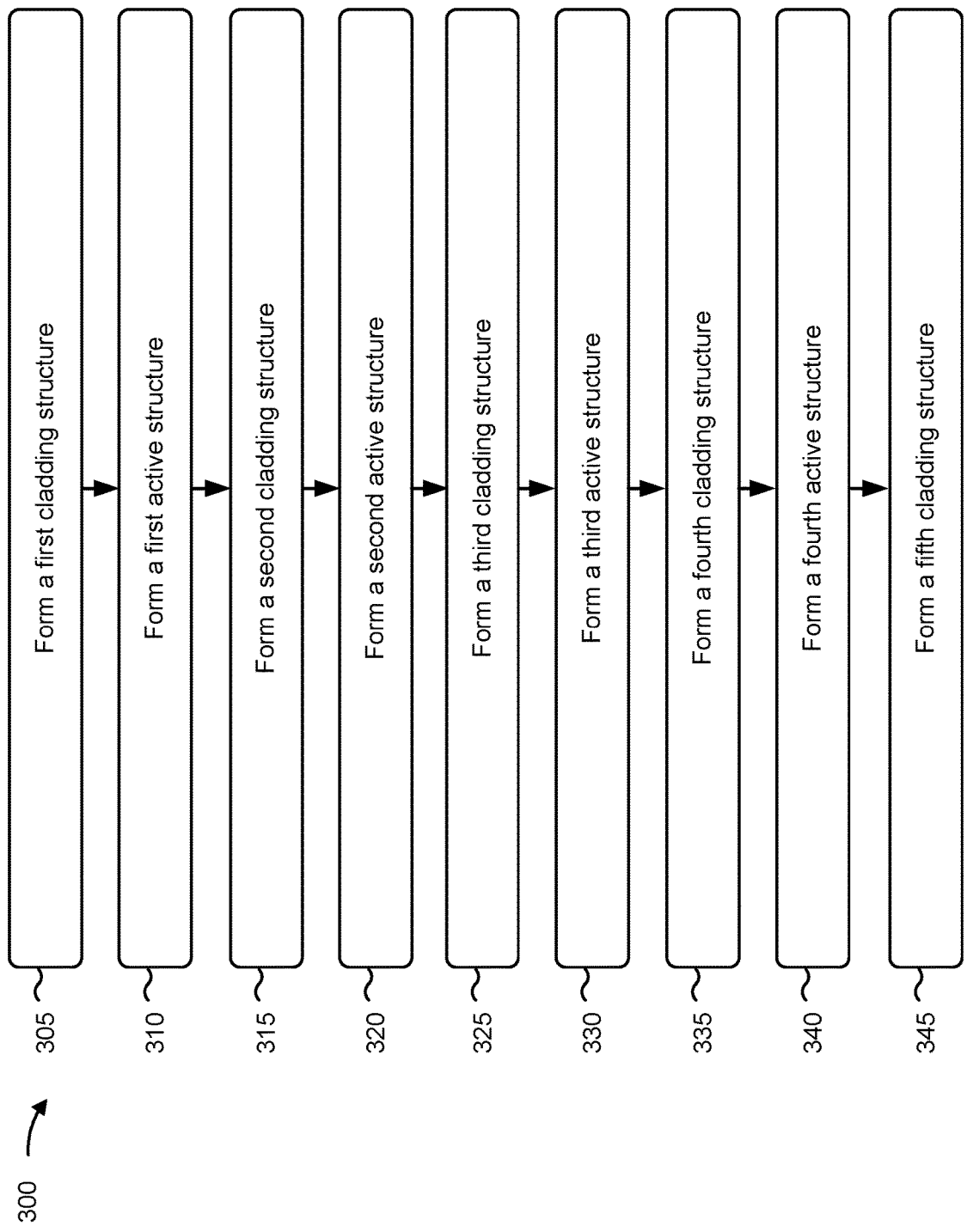
FIG. 3 is a flowchart of an example process relating to forming an optical device described herein.

FIG. 3 is a flowchart of an example process 300 relating to forming an optical device (e.g., an optical device 200, 220, or 250 described herein). In some implementations, one or more process blocks of FIG. 3 may be performed by a sputtering system associated with one or more sputtering processes, such as one or more magnetron sputtering processes, one or more ion-beam sputtering processes, one or more reactive sputtering processes, one or more AC sputtering processes, or one or more DC sputtering processes.

As shown in FIG. 3, process 300 may include forming a first cladding structure (block 305). For example, the sputtering system may form a first cladding structure (e.g., over a substrate) using a first sputtering process.

As further shown in FIG. 3, process 300 may include forming a first active structure (block 310). For example, the sputtering system may form a first active structure over the first cladding structure using a second sputtering process (e.g., that is different than the first sputtering process).

As further shown in FIG. 3, process 300 may include forming a second cladding structure (block 315). For example, the sputtering system may form a second cladding structure over the first active structure using the first sputtering process (e.g., when the first cladding structure and the second cladding structure include a same, or similar, material). In some implementations, the first cladding structure, the first active structure, and the second cladding structure may form a photonic transmission structure (e.g., the first photonic transmission structure 100-1 described herein in relation to FIG. 2A).

As further shown in FIG. 3, process 300 may include forming a second active structure (block 320). For example, the sputtering system may form a second active structure over the second cladding structure using a third sputtering process (e.g., that is different than the first sputtering process and the second sputtering process). Alternatively, the sputtering system may form the second active structure over the second cladding structure using the second sputtering process (e.g., when the first active structure and the second active structure include a same, or similar, material or solution). In some implementations, process 300 may include using one or more etching processes (e.g., one or more chemical etching processes) to divide the second active structure into two or more separate substructures.

As further shown in FIG. 3, process 300 may include forming a third cladding structure (block 325). For example, the sputtering system may form a third cladding structure over the second active structure using the first sputtering process (e.g., when the first cladding structure and the third cladding structure include a same, or similar, material). In some implementations, the first cladding structure, the first active structure, the second cladding structure, the second active structure, and the third cladding structure may form a photonic transmission structure (e.g., the first photonic transmission structure 120-1 or the first photonic transmission structure 150-1 described herein in relation to FIGS. 2B-2C). Alternatively, the second active structure and the third cladding structure may form a photonic transmission structure (e.g., the second photonic transmission structure 100-2 described herein in relation to FIG. 2A).

As further shown in FIG. 3, process 300 may include forming a third active structure (block 330). For example, the sputtering system may form a third active structure over the third cladding structure using the second sputtering process (e.g., when the third active structure and the first active structure include a same, or similar, material or solution).

As further shown in FIG. 3, process 300 may include forming a fourth cladding structure (block 335). For example, the sputtering system may form a fourth cladding structure over the third active structure using the first sputtering process (e.g., when the first cladding structure and the fourth cladding structure include a same, or similar, material).

As further shown in FIG. 3, process 300 may include forming a fourth active structure (block 340). For example, the sputtering system may form a fourth active structure over the fourth cladding structure using the third sputtering process (e.g., when the fourth active structure and the second active structure include a same, or similar, material or solution). Alternatively, the sputtering system may form the fourth active structure over the fourth cladding structure using the second sputtering process (e.g., when the third active structure and the fourth active structure include a same, or similar, material or solution).

As further shown in FIG. 3, process 300 may include forming a fifth cladding structure (block 345). For example, the sputtering system may form a fifth cladding structure over the fourth active structure using the first sputtering process (e.g., when the first cladding structure and the fifth cladding structure include a same, or similar, material). In some implementations, the third active structure, the fourth cladding structure, the fourth active structure, and the fifth cladding structure may form a photonic transmission structure (e.g., the second photonic transmission structure 120-2 or the second photonic transmission structure 150-2 described herein in relation to FIGS. 2B-2C).

Process 300 may include additional implementations, such as any single implementation or any combination of implementations described below and/or in connection with one or more other processes described elsewhere herein.

In a first implementation, one of the first active structure and the second active structure includes at least one of a niobium tantalum oxide solution, a niobium titanium oxide solution, or a niobium tantalum titanium oxide solution, and another of the first active structure and the second active structure includes at least one of a niobium tantalum oxide solution, a niobium titanium oxide solution, or a niobium tantalum titanium oxide solution, an amorphous silicon (a-Si) material, a hydrogenated amorphous silicon (a-SiH) material, a nitride-based material, an oxide-based material, a metal material, or a semiconductor material. Additionally, or alternatively, one of the third active structure and the fourth active structure includes at least one of a niobium tantalum oxide solution, a niobium titanium oxide solution, or a niobium tantalum titanium oxide solution, and another of the third active structure and the fourth active structure includes at least one of niobium tantalum oxide solution, a niobium titanium oxide solution, or a niobium tantalum titanium oxide solution, an amorphous silicon (a-Si) material, a hydrogenated amorphous silicon (a-SiH) material, a nitride-based material, an oxide-based material, a metal material, or a semiconductor material.

In a second implementation, alone or in combination with the first implementation, each of the first cladding structure, the second cladding structure, the third cladding structure, the fourth cladding structure, and the fifth cladding structure includes at least one of: a silicon dioxide ($SiO_2$) material, a polymer material, or an air cladding.

In a third implementation, alone or in combination with one or more of the first and second implementations, a processing temperature associated with at least one of the second sputtering process or the third sputtering process satisfies a processing temperature threshold, wherein the processing temperature threshold is less than or equal to 200 degrees Celsius.

In a fourth implementation, alone or in combination with one or more of the first through third implementations, a processing temperature associated with the second sputtering process and/or a processing temperature associated with the third sputtering process satisfies a processing temperature threshold, wherein the processing temperature threshold is less than a temperature associated with affecting a respective optical behavior of at least one of the first active structure, the second active structure, the third active structure, or the fourth active structure.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, when a solution or material is referred to by a specific chemical name or formula, the solution or material may include non-stoichiometric variations of the stoichiometrically exact formula identified by the chemical name.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A photonic transmission structure, comprising:
   a substrate;
   a cladding structure disposed over a surface of the substrate; and
   an active structure disposed on a surface of the cladding structure,
      wherein the active structure includes at least one of a niobium tantalum oxide solution, a niobium titanium oxide solution, or a niobium tantalum titanium oxide solution, and
      wherein the photonic transmission structure is one or more of an optical logic gate, a frequency comb, an optical amplifier, or an optical modulator.

2. The photonic transmission structure of claim 1, wherein the active structure includes the niobium tantalum oxide solution.

3. The photonic transmission structure of claim 1, wherein the active structure includes the niobium titanium oxide solution.

4. The photonic transmission structure of claim 1, wherein the cladding structure is disposed directly on the surface of the substrate.

5. The photonic transmission structure of claim 1, wherein the cladding structure includes an oxide material, a polymer material, or an air cladding.

6. The photonic transmission structure of claim 1, wherein the active structure is disposed directly on the surface of the cladding structure.

7. The photonic transmission structure of claim 1, wherein the substrate has a refraction index that is less than or equal to 1.6.

8. The photonic transmission structure of claim 1, wherein the active structure has a planar structure, and
   wherein a width of the planar structure is less than or equal to a width of the substrate.

9. The photonic transmission structure of claim 1, wherein the active structure has a thickness in a range of 100 nanometers (nm) to 2000 nm,
   wherein the thickness varies less than a threshold percentage across a surface of the active structure, and
   wherein the threshold percentage is less than or equal to 1%.

10. A structure, comprising:
    a cladding structure that includes one or more of:
       an oxide material,
       a polymer material, or
       an air cladding; and
    an active structure disposed on a surface of the cladding structure,
    the active structure including at least one of:
       a niobium aluminum oxide solution,
       a niobium strontium oxide solution,
       a niobium aluminum strontium oxide solution,
       a niobium tantalum aluminum oxide solution,
       a niobium titanium aluminum oxide solution,
       a niobium tantalum strontium oxide solution,
       a niobium titanium strontium oxide solution,
       a niobium titanium tantalum aluminum oxide solution,
       a niobium titanium tantalum strontium oxide solution,
       a niobium titanium aluminum strontium oxide solution,
       a niobium tantalum aluminum strontium oxide solution, or
       a niobium titanium tantalum aluminum strontium oxide solution,
          wherein the structure is one or more of an optical logic gate, a frequency comb, an optical amplifier, or an optical modulator.

11. The structure of claim 10, wherein the cladding structure includes the oxide material, and
    wherein the oxide material is a silicon dioxide ($SiO_2$) material.

12. The structure of claim 10, wherein the cladding structure includes the polymer material, and
    wherein the polymer material is a siloxane polymer material.

13. The structure of claim 10, wherein the cladding structure includes the air cladding.

14. The structure of claim 10, wherein the active structure is disposed directly on the surface of the cladding structure.

15. The structure of claim 10, wherein the active structure has a planar structure.

16. An optical device, comprising:
    a first photonic transmission structure; and
    a second photonic transmission structure formed on top of the first photonic transmission structure,
       the second photonic transmission structure including:
          a cladding structure, and
          an active structure disposed on a surface of the cladding structure, wherein the active structure includes at least one of:
   a niobium aluminum oxide solution,
   a niobium strontium oxide solution,
   a niobium aluminum strontium oxide solution,
   a niobium tantalum aluminum oxide solution,
   a niobium titanium aluminum oxide solution,
   a niobium tantalum strontium oxide solution,
   a niobium titanium strontium oxide solution,
   a niobium titanium tantalum aluminum oxide solution,
   a niobium titanium tantalum strontium oxide solution,
   a niobium titanium aluminum strontium oxide solution,
   a niobium tantalum aluminum strontium oxide solution, or
   a niobium titanium tantalum aluminum strontium oxide solution, and
wherein the optical device is one or more of an optical logic gate, a frequency comb, an optical amplifier, or an optical modulator.

17. The optical device of claim 16, wherein the active structure includes a niobium tantalum oxide solution or a niobium titanium oxide solution.

18. The optical device of claim 16, wherein the second photonic transmission structure further includes a substrate, and
   wherein the cladding structure is disposed directly on the surface of the substrate.

19. The photonic transmission structure of claim 1, wherein the cladding structure is a first cladding structure and the active structure is a first active structure; and
   wherein the photonic transmission structure further comprises:
      a second cladding structure disposed over a surface of the first active structure; and
      a second active structure and a third active structure disposed over a surface of the second cladding structure.

20. The photonic transmission structure of claim 19, further comprising:
   a third cladding structure disposed over a surface of the second active structure and a surface of the third active structure.

* * * * *